(12) United States Patent
Koehn et al.

(10) Patent No.: US 8,791,609 B2
(45) Date of Patent: Jul. 29, 2014

(54) VIBRATION DAMPING FOR AN ELECTRIC DEVICE

(71) Applicants: Heinz-Gernhard Koehn, Hamburg (DE); Peter Zehnel, Leipzig (DE)

(72) Inventors: Heinz-Gernhard Koehn, Hamburg (DE); Peter Zehnel, Leipzig (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 13/666,179

(22) Filed: Nov. 1, 2012

(65) Prior Publication Data

US 2013/0293039 A1 Nov. 7, 2013

Related U.S. Application Data

(63) Continuation of application No. PCT/EP2011/002448, filed on May 17, 2011.

(30) Foreign Application Priority Data

May 19, 2010 (DE) .......................... 10 2010 020 912

(51) Int. Cl.
*H02K 5/24* (2006.01)
*H02K 5/173* (2006.01)

(52) U.S. Cl.
CPC ............... *H02K 5/24* (2013.01); *H02K 5/1732* (2013.01)
USPC .................................. 310/51; 310/89; 310/90

(58) Field of Classification Search
USPC .............................................. 310/90, 51, 89
See application file for complete search history.

(56) References Cited

U.S. PATENT DOCUMENTS

| 3,264,503 | A |   | 8/1966  | Wiedemann |
|-----------|---|---|---------|-----------|
| 3,459,978 | A | * | 8/1969  | Helms et al. .................. 310/51 |
| 3,780,937 | A |   | 12/1973 | Tahara et al. |
| 2008/0007127 | A1 |   | 1/2008 | Hong et al. |

FOREIGN PATENT DOCUMENTS

| DE | 4 71 572 A | 2/1929 |
| DE | 10 19 871 A | 11/1957 |
| DE | 19 53 272 U | 1/1967 |
| DE | 20 16 866 A | 10/1971 |
| DE | 21 04 452 A1 | 8/1972 |
| DE | 2104452 * | 8/1972 |
| DE | 24 40 549 A1 | 3/1976 |
| DE | 42 24 980 A1 | 2/1994 |
| DE | 43 24 912 A1 | 1/1995 |
| DE | 10 2009 009 958 A1 | 9/2010 |
| EP | 0365 963 A2 | 5/1990 |
| EP | 1 710 894 A1 | 4/2005 |
| WO | WO 2009/144171 A1 | 12/2009 |

* cited by examiner

*Primary Examiner* — Tran Nguyen
*Assistant Examiner* — Leda Pham
(74) *Attorney, Agent, or Firm* — Von Rohrscheldt Patents

(57) ABSTRACT

The present invention relates to an electrical device including a stator and a rotor, wherein the electrical device is preferably a generator, a motor or similar, in particular a centrifuge motor, wherein the rotor, in particular a motor shaft is rotatably supported through at least one bearing relative to the stator, wherein at least one damping device is provided between the stator and the rotor, wherein the damping device includes at least one damping element. Thus, the device provides a high level of integrated vibration damping and internal damping of the device can be adapted to particular properties and applications.

10 Claims, 2 Drawing Sheets

1

VIBRATION DAMPING FOR AN ELECTRIC DEVICE

RELATED APPLICATIONS

This application is a continuation of International application PCT/EP2011/002448 filed on May 17, 2011 claiming priority from German application DE 10 2010 020 912.0 filed on May 19, 2012. All the above applications are incorporated in their entirety by this reference.

FIELD OF THE INVENTION

The present invention relates to electric devices, in particular centrifuge motors.

BACKGROUND OF THE INVENTION

Devices of this type include a stator and a rotor, and are configured for electro-mechanical energy conversion. Examples for electrical devices of this type are generators and motors, e.g. electric fans. The present invention relates in particular to centrifuge motors.

In a device of this type, the rotor, in particular a motor shaft is rotatably supported through at least one bearing relative to the stator. In order to compensate for axial movements between the rotor and the stator, spring elements are being used which generate a defined preload between the stator and the rotor, thus supporting both components in a defined position relative to one another.

As a function of the configuration of the components used, this means their materials, masses, sizes and geometries and the loading of the device, different vibrations occur under different operating conditions. These vibrations are thus decoupled from the environment in that damping elements are provided between the device and the environment, e.g. buffer bases or dampened suspensions for the device.

The occurring vibrations depend from many individual influencing factors. Therefore vibration damping has to be adapted to a particular application and with respect to the component properties through individually configured vibration dampers between a device and an ambiance. For example motors that are used in centrifuges, experience different operating conditions as a function of motor rotation speed, and also the mass of an employed rotor strongly influences the operating conditions.

A vibration damping that suppresses all vibration conditions is not possible, rather only an optimization can be performed so that critical vibrations are dampened for all possible operating conditions. However, an optimization of this type typically has to be performed again when the application of the electrical device changes, e.g. when a rotor of a centrifuge motor is exchanged and, as recited supra, not all vibrations can be completely dampened for all operating conditions.

BRIEF SUMMARY OF THE INVENTION

Thus, it is the object of the present invention to provide a vibration damping arrangement which provides significantly improved vibration damping also for different operating conditions.

This object is achieved with an electrical device including a stator; and a rotor, wherein the electrical device is a generator, a motor or a centrifuge motor, wherein the rotor that is configured as a motor shaft is rotatably supported through at least one rotor bearing relative to the stator, wherein at least one damping device is provided between the stator and the rotor, wherein the damping device includes at least one damping element, wherein the damping element includes an elastomeric material, wherein a rotor bearing support includes a space for an expansion of the damping element, wherein the space is configured as an indentation extending in a circumferential direction as well as in a radially inward direction of the damping element, wherein the damping device is configured to provide a preload between the stator and the rotor, wherein the damping device is configured to selectively adjust the preload, and wherein the damping element is arranged between the rotor bearing support and the at least one rotor bearing. Advantageous embodiments of this object are provided in the dependent claims.

The invention is based on the finding that the difficulty when optimizing vibration damping exists in that the vibrations occurring in different operating conditions have various causes that make simultaneous damping more difficult. This is addressed by the invention which produces controlled vibration damping irrespective of the damping between device and environment already in the interior of the device. Thus, a portion of the vibrations is eliminated in advance and the vibration damping between the environment and the device can be achieved more efficiently also for different operating conditions.

This vibration damping according to the invention is facilitated in that at least one damping device is provided between the stator and the rotor of the device in order to dampen relative vibrations between the rotor and the stator. Thus the relative vibrations are separated from other forms of vibrations and the other forms of vibrations can be dampened in a substantially optimized manner by providing damping between the device and the environment.

The damping device according to the invention is a non-metallic spring element. Spring elements of this type are typical prior art preloading devices. The arrangement of the spring elements of this type between the stator and the rotor typically does not provide any vibration damping according to the invention. Spring elements only accommodate vibrations. It is insignificant in this context that spring elements of this type typically provide some amount of damping due to the material based on heat generation, since this damping is comparatively small and not controllable and thus not significantly reduces the excited vibrations of the device. Metal spring elements and similar are thus no damping devices according to the present invention.

Since a damping device is provided according to the invention between a rotor and a stator, an adaptation of the damping to the operating conditions and properties associated with the device can be provided through selecting suitable materials for the damping device, while simultaneously covering a maximum spectrum of operating conditions and properties of the device, e.g. different rotor masses for centrifuge motors. A selective adjustability is also controllable quite well in a series production since the vibrations to be dampened are caused by the device itself and essentially an adaptation to the properties of the ambient is not required.

While the support of the rotating components is configured substantially rigid in prior art devices and spring elements are used for compensating axial movements, wherein a defined preload is generated through the spring elements, the support is now provided through the damping device which may also provide the preload, wherein the bearing is maintained axially movable. This overcomes the prior art disadvantage that the spring preload which permits limited relative movements between the rotor and the stator in order to compensate for component tolerances in axial direction facilitates non-dampened vibrations in particular operating modes.

According to an advantageous embodiment it is provided that the damping device is configured for damping axial vibrations of the rotor relative to the stator. This prevents internal axial vibrations during operations of the device in a particularly effective manner. Axial in this context means that the relative vibration is provided along the axis of the rotor to the stator. In case of centrifuge motors which are typically vertically installed in centrifuges these are vertical vibrations.

The vertical vibrations are particularly relevant for centrifuge motors, which are being operated at very high rotation speeds of e.g. more than 16,000 revolutions per minute, since particularly at high speeds like that, vertical vibrations between rotor and stator have negative effects. This results in resonance effects, the service life of the bearing decreases and energy loss takes places through the vibrations. Through the damping of the relative vertical vibrations, an increase of the bearing service life is facilitated, and simultaneously also the service life of the centrifuge motor is increased, because until now, due to economic reasons, no bearing replacement was performed for centrifuge motors, but also considering the fact that worn out bearings lead to the motor shaft running hot, the centrifuge motor is generally replaced as an entire unit. Another advantage of preventing relative vertical vibrations is that the centrifuge becomes quieter and provides a subjectively more appealing sound spectrum.

In a particularly advantageous embodiment, the damping device includes at least one damping element which includes an elastomeric material, wherein preferably fluororubber, perfluororubber, polyurethane, or similar are used as elastomeric materials. Besides having a sufficiently high damping capability, elastomeric materials have excellent form-stability, so that the damping properties of the damping device are maintained over a long time.

Thus, it is preferably provided that the damping element is configured annular because this provides very uniform damping. This annular configuration of the damping elements is certainly is also advantageous when the damping element does not include an elastomeric material.

It is useful in particular, when the damping element is arranged between a support for the rotor bearing and the bearing itself. Thus, the damping device can be kept very compact and can be integrated in existing devices. Furthermore, the damping is achieved in a very efficient manner in an arrangement of this type because it is performed directly at the location where the vibration is generated.

Thus it is very advantageous when the support includes space for an expansion of the damping element, wherein the space is preferably provided as an indentation in the support, wherein the indentation is provided preferably so that it extends in circumferential direction around the damping element. Thus, the damping element can easily yield to imparted forces within the range of its material properties and can deform accordingly. Through another advantageous embodiment, wherein the damping device is configured to cause a preload between the stator and the rotor, and the advantageous embodiment, wherein the damping device is configured for selective adaptation of the preload, a very precise adjustment of the preload can be provided.

The preload then does not have to be provided by a spring element, in particular a metal spring, but can also be provided by the damping element itself, wherein the stator and the rotor are supported in a defined position relative to one another.

The selective adaptation of the preload, on the one hand side, provides a controlled adjustment of the bearings as a function of the operating conditions and the individual properties of the device. When the preload is provided through the damping element, then there is another advantage in that the damping properties of the damping element can be changed in a controlled manner in order to provide an adaptation to individual device properties or operating conditions.

Furthermore, the selective adjustability of the preload provides an option for setting up a defined preload independent from manufacturing tolerances. When pre-loading through springs, the problem was that the preload varied as a function of tolerances of the installation space and of the springs.

In a particularly advantageous embodiment, the damping device includes a clamping element that is arranged at the rotor and supported at the bearing, wherein the clamping element is preferably configured as a clamping sleeve. This can cause a pre-load in a particularly simple manner.

In this context it is provided in particular, that a threaded connection is provided between the clamping element and the rotor. Alternatively, it can also be provided that the clamping element is arranged at a threaded element, wherein a threaded connection exists between the threaded element and the rotor. Thus, the preload can be adjusted in a particularly simple manner. Optionally, counter-safety can also be provided in order to keep the preload constant even for high rotation speeds and loads. Because of this, a compensation of preload fluctuations that are inherent to a series production is attained.

Furthermore, a magnet for speed measurement can be provided at the clamping sleeve or the threaded element.

It is particularly advantageous when a second bearing is provided for the rotor which forms an axial stop for the rotor, wherein the stop is preferably provided between the bearing and a ring element attached at the rotor.

BRIEF DESCRIPTION OF THE DRAWINGS

The features of the present invention and additional advantages are now described with based on a advantageous embodiment with reference to drawing figures, wherein.

DETAILED DESCRIPTION OF THE INVENTION

Figure 1:
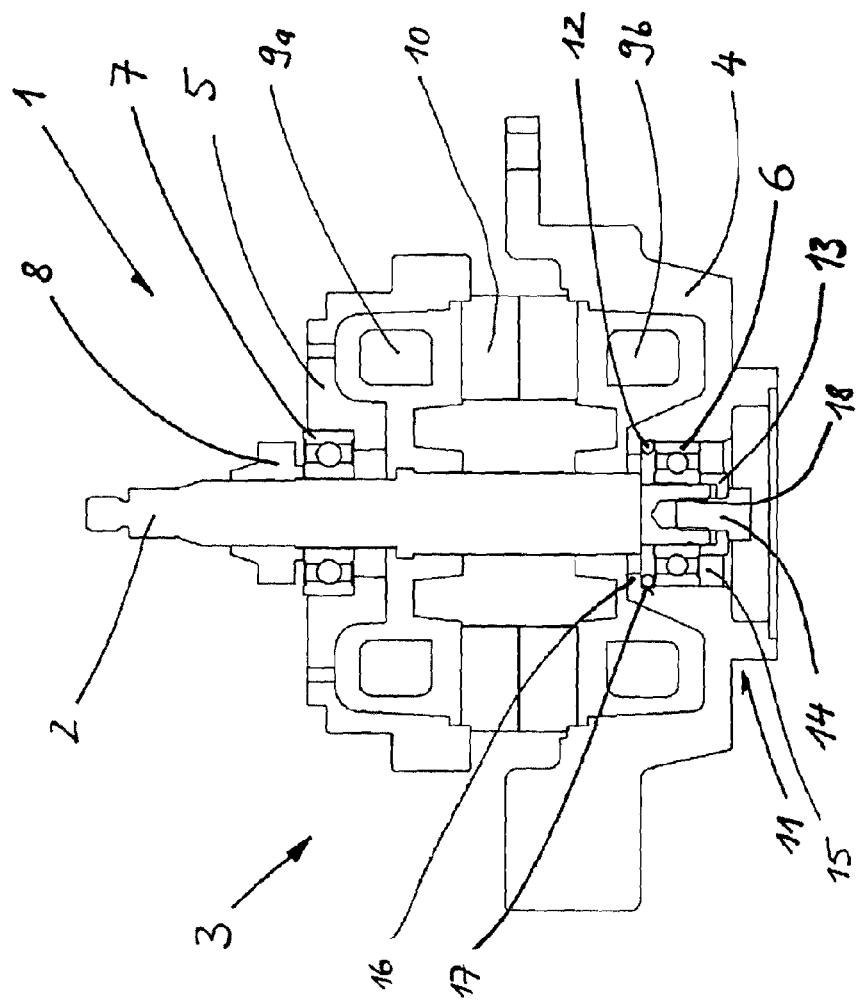
FIG. 1 illustrates a sectional view of the electric device according to the invention in an unloaded condition.
Figure 2:
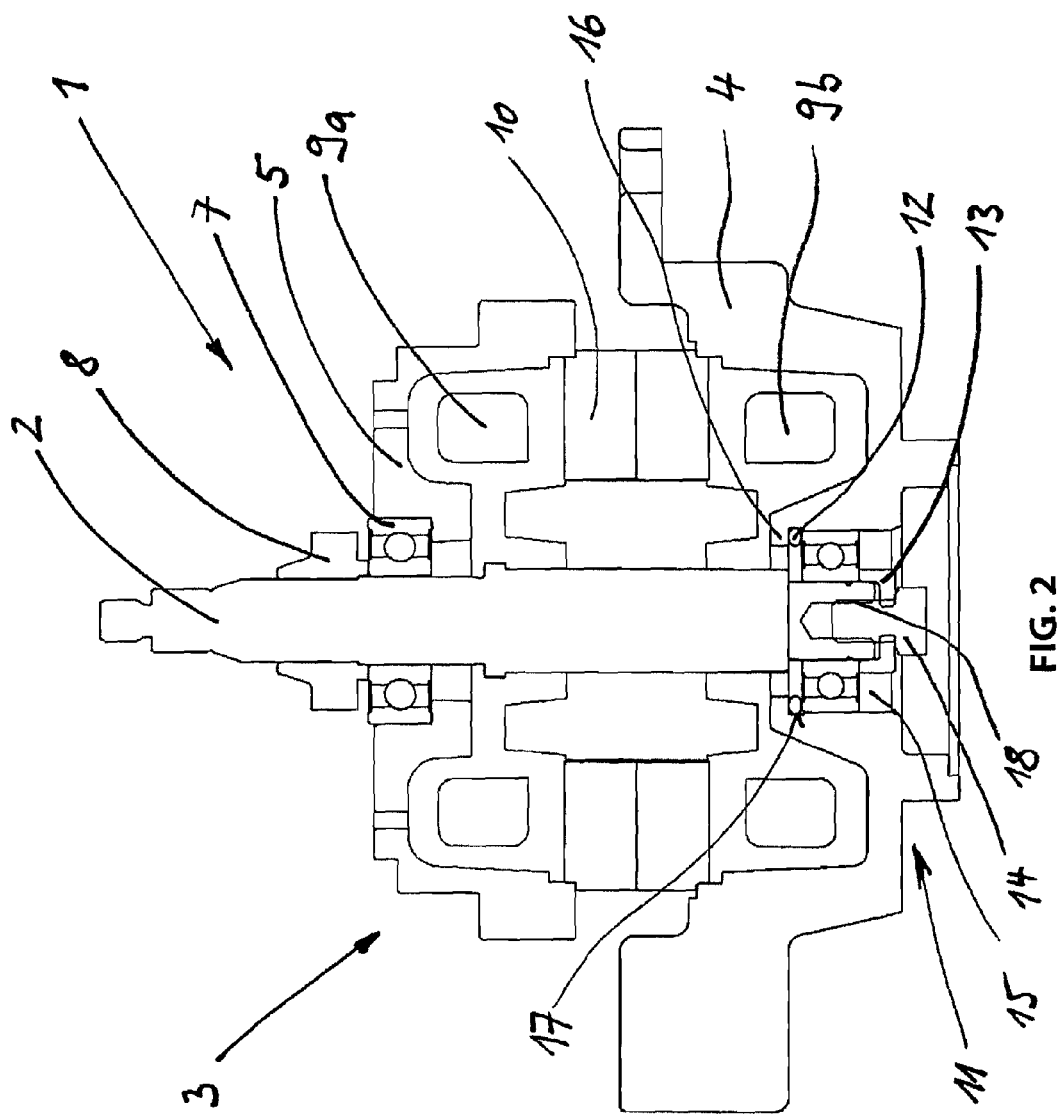
FIG. 2 illustrates the device according to FIG. 1 in a loaded condition.

FIG. 1 and FIG. 2 illustrate a purely schematic sectional view of the electric device according to the invention configured as a centrifuge motor 1 in two operating conditions. Thus, FIG. 1 illustrates the centrifuge motor 1 in an unloaded condition, and FIG. 2 illustrates the centrifuge motor 1 in a loaded condition.

It is apparent that the centrifuge motor 1 includes a rotor, namely a motor shaft 2 and a stator 3 relative to which the rotor 2 is rotatably supported. Thus, the stator 3 includes a lower bearing support 4 and an upper bearing support 5 in which a respective lower bearing 6 and upper bearing 7 for the rotor 2 are received. A throw ring 8 is attached at the motor shaft 2 through gluing, shrinking or similar as an axial stop for the upper bearing 7, wherein the throw ring 8, through its upper conical shape, removes any moisture penetrating from the centrifuge to the centrifuge motor 1 when necessary during operation. Furthermore, the stator 3 of the centrifuge motor 1 includes two coils 9a, 9b and a sheet metal packet 10.

In order to dampen vertical vibrations of the motor shaft 2 relative to the stator 3, a damping device 11 is provided which includes a damping element 12, a clamping sleeve 13 and a threaded element 14. The damping element 12 is arranged between a clamping collar 16 protruding in radially inward direction above the cylindrical receiver cavity 15 for the lower bearing support 4 and the lower bearing 6. Thus, a groove 17 is fabricated in the portion of the damper element 12 in the cylindrical receiver 15 of the lower bearing support 4, wherein the groove extends in circumferential direction of the damping element 12 and provides expansion space for the damping element 12, wherein the expansion space has an inner width so that even at a maximum preload of the damping element 12 between a lower bearing 6 and a lower bearing support 4, the deformed damping element 12 does not contact the lower bearing support 4 in circumferential direction of the lower bearing support 4 (cf. FIG. 2).

The damping element 12 is preferably made from a fluororubber or a perfluororubber, thus provides a high amount of damping and simultaneously possesses high and long-lasting shape stability. The damping element is fixated between the lower bearing support 4 and the lower bearing 6 in that the clamping collar 16 which is arranged at the threaded element 14 is threaded at the motor shaft 2 through the threaded element 14. Since the throw ring 8 forms an axial stop for the motor shaft 2 relative to the upper bearing 7, the lower bearing 6 is fixated with respect to its position which supports the preload element 12.

Vertical vibrations impacting the motor shaft 2 are received by the damping element 12 and eliminated due to its high level of damping. The threaded connection 18 provided between the threaded element 14 and the motor shaft 2 facilitates adjusting the damping device 11 very precisely and in particular compensating unavoidable manufacturing tolerances.

Furthermore, as illustrated in FIG. 2, controlled preloading of the damping device 11 through the clamping sleeve 13 facilitates preloading the damping element 12 beyond its mere fixation between the lower bearing support 4 and the lower bearing 6, wherein the damping element 12 is formed and penetrates the groove 17. Thus, the lower bearing 6 can be adjusted in a controlled manner and the damping effect of the damping element 12 is changed.

Another option for changing the damping of the damping device 11 is controlled influencing of the damping of the damping element 12 through selecting a material which has damping properties that are required for the respective application.

As an alternative to the illustrated use of the clamping sleeve 13 in combination with a threaded element 14 which interacts with the motor shaft 2 through the threaded connection 18, it can also be provided that the clamping sleeve 13 is directly threaded to the motor shaft 2 through an inner thread and an outer thread arranged at the motor shaft 2.

In the illustrated advantageous embodiment essentially only vertical vibrations, this means vibrations in axial direction of the motor shaft 2, are dampened. Alternatively and/or additionally, it can also be provided that vibrations occurring vertical thereto, thus radial vibrations occurring with respect to the motor shaft 2 are dampened. Thus, it can also be provided, that a suitable damping device 11 is arranged in circumferential direction between the lower bearing 6 and the lower bearing support 4, wherein the damping device 11, in turn, includes an damping element made from elastomeric material in order to advantageously provide a preload, e.g. through a double wedge, which is arranged in circumferential direction between the damping element and the lower bearing support 4 and which can be preloaded.

Thus, it is facilitated through the present invention to adjust the damping for centrifuge motors 1 in a controlled manner, also e.g. for a rotor change. Thus, however, an access to the threaded element 14 has to be provided through the housing base of the centrifuge.

It is evident from the description provided supra that the electric device according to the invention has highly integrated vibration damping with respect to the relative vibrations between rotor 2 and stator 3, so that additional damping measures between device and environment can be provided in a substantially standardized manner. The internal damping of the device can thus be adapted to particular conditions and applications in a particularly simple manner.

What is claimed is:

1. An electrical device, comprising
a stator; and
a rotor,
wherein the electrical device is a generator, a motor or a centrifuge motor,
wherein the rotor that is configured as a motor shaft is rotatably supported through at least one rotor bearing relative to the stator,
wherein at least one damping device is provided between the stator and the rotor,
wherein the damping device includes at least one damping element,
wherein the damping element includes an elastomeric material,
wherein a rotor bearing support includes a space for an expansion of the damping element,
wherein the space extends in a radially outward direction as well as in a radially inward direction from the damping element,
wherein the damping device is configured to provide a preload between the stator and the rotor,
wherein the damping device is configured to selectively adjust the preload, and
wherein the damping element is arranged between the rotor bearing support and the at least one rotor bearing.

2. The device according to claim 1, wherein the damping device dampens axial vibrations of the rotor relative to the stator.

3. The device according to claim 1, wherein the damping element includes fluororubber, perfluororubber, polyurethane.

4. The device according to claim 1, wherein the damping element is configured annular.

5. The device according to claim 1, wherein the damping device includes a preload element configured as a clamping sleeve that is arranged at the rotor and supported at the at least one rotor bearing.

6. The device according to claim 5,
wherein a threaded connection is provided between the preload element and the rotor, or the preload element is arranged at a threaded element,
wherein a threaded connection is provided between the threaded element and the rotor.

7. The device according to claim 1,
wherein a second bearing is provided for the rotor,
wherein the second bearing provides an axial stop for the rotor, and
wherein the axial stop is configured between the second bearing and a ring element attached to the rotor.

8. The device according to claim 1, wherein the damping element is arranged in its entirety axially between the rotor bearing support and the at least one rotor bearing.

9. The device according to claim 1, wherein the damping element does not contact the rotor bearing support in the radially outward direction of the damping element even at a maximum preload of the damping element.

10. The device according to claim 1,
wherein the damping element is arranged in its entirety axially between the rotor bearing support and the at least one rotor bearing, and
wherein the damping element does not contact the rotor bearing support in the radially outward direction of the damping element even at a maximum preload of the damping element.

* * * * *